United States Patent [19]

Takada

[11] Patent Number: 4,966,389
[45] Date of Patent: Oct. 30, 1990

[54] INFLATABLE AIR BAG FOR PROTECTION OF A VEHICLE OCCUPANT

[76] Inventor: Juichiro Takada, No. 12-1, Shinmachi 3-Chome, Setagaya-ku, Tokyo, Japan

[21] Appl. No.: 328,968

[22] Filed: Mar. 27, 1989

[51] Int. Cl.⁵ .............................................. B60R 21/16
[52] U.S. Cl. ................................................... 280/743
[58] Field of Search ............... 280/728, 743, 731, 736, 280/740, 741, 742, 743

[56] References Cited

U.S. PATENT DOCUMENTS 3,938,824  2/1976  Patzelt.

FOREIGN PATENT DOCUMENTS

| 2333888 | 1/1974 | Fed. Rep. of Germany. |
| 2256720 | 5/1974 | Fed. Rep. of Germany. |
| 2335798 | 8/1974 | Fed. Rep. of Germany. |
| 2552815 | 5/1977 | Fed. Rep. of Germany ...... 280/743 |
| 61-11084 | 4/1986 | Japan .................................. 280/743 |
| 1438032 | 6/1976 | United Kingdom ................ 280/731 |

Primary Examiner—Charles A. Marmor
Assistant Examiner—Karin Tyson
Attorney, Agent, or Firm—Brumbaugh, Graves, Donohue & Raymond

[57] ABSTRACT

An inflatable air bag for protection of a vehicle occupant by absorbing the secondary impact of the occupant as he or she is thrown forward by inertia comprises a first fastening member at the gas inflow side, a second fastening member at the impact side and a plurality of inflation-controlling members connected between the fastening members at junctures therewith. At least the portions of the first fastening member forming the junctures with the inflation-controlling members are resilient so that they absorb energy and reduce the impact forces exerted on the inflation-controlling members when they arrest the movement of the impact side of the air bag during inflation.

1 Claim, 5 Drawing Sheets

INFLATABLE AIR BAG FOR PROTECTION OF A VEHICLE OCCUPANT

FIELD OF THE INVENTION

The present invention relates to an air bag which is normally folded into a compartment, such as a box within the steering wheel hub, in the dashboard on the passenger side, or in the rear of a front seat, and which inflates virtually instantaneously in a collision and absorbs the secondary impact of the occupant as he or she is thrown forward by inertia.

BACKGROUND OF THE INVENTION

FIG. 1 is a schematic side view of a known air bag system 50 as installed in a compartment of the hub of a steering wheel 51, and FIG. 2 is a developmental view of parts of the interior of the air bag 52. In the event of a collision, an inflator (not shown) releases a gas rapidly into the air bag 52, thereby inflating it. It is known that there are advantages to having the bag assume a somewhat flattened, thick disc-like shape at the completion of filling and to provide inflation-controlling members 53 within the air bag to establish the desired shape. The members, which are usually fabric bands connected between the center of the gas filling side and the center of the impact side of the bag 52, hold the center of the impact side at a fixed distance from the inflator so that the gas is deflected laterally to fill the bag perimeter 52A. The thick disc-like shape best protects the occupant as he or she is thrown forward.

In a known arrangement, four equally spaced-apart inflation-controlling straps 53 (only one is shown in FIG. 2) are joined to a fastening member 55A by stitching 56A, and the fastening member 55A is stitched to the air bag 52 around the gas inlet opening 54. The fastening member 55A, in addition to providing for attachment of the straps 53, reinforces the air bag 52 in the region where it is attached to the inflator. Holes 57 are punched in the bag 52 and the fastening member 55A for fasteners that attach the air bag to the inflator. Similarly, an annular fastening member 55B provides for attachment of the straps 53 to the impact side of the bag 52 and reinforces the bag in the attachment region. The straps 53, fastening member 55B and the bag 52 are stitched together by three concentric circular stitch lines 56B.

When the air bag 52 is inflated, the gas jet is directed against the center part of the impact side, which is propelled rapidly toward the occupant until its movement is arrested by the inflation-controlling members 53. Stopping the movement of the center part of the impact side of the bag imposes high impact tensile forces on the members 53. Those forces produce high degrees of stress concentration in the portions of the straps where they join the fastening members 55A and 55B, namely, the areas indicated by the arrows "a" and "b" in FIG. 2. Accordingly, there is some chance that the inflation-controlling members 53 will separate from one or the other of the fastening members 55A and 55B along the stitching 56A or 56B, thereby allowing the bag to fill in an undesired way and possibly attain a less than optimum shape.

SUMMARY OF THE INVENTION

An object of the present invention is to provide inflation-controlling members in an air bag that will not separate from the fastening members and thereby ensure that the air bag will fill properly and have the desired shape at the end of development. As a result, the vehicle occupant will be properly protected from a secondary collision resulting from an accident.

There is provided, according to the present invention, an inflatable air bag for protection of a vehicle occupant by absorbing the secondary impact of the occupant as he or she is thrown forward by inertia comprising a first fastening member at the gas inflow side, a second fastening member at the impact side and a plurality of inflation-controlling members connected between the fastening members at junctures therewith. The invention is characterized in that at least the portions of the first fastening member forming the junctures with the inflation controlling members are resilient so that they absorb energy and reduce the impact forces exerted on the inflation-controlling members when they arrest the movement of the impact side of the air bag during inflation.

In a preferred embodiment the invention is further characterized in that the first fastening member is composed of at least one woven fabric sheet which is positioned such that the portions at the junctures are oriented on a bias to the direction of the impact tensile forces exerted on the inflation-controlling members.

After partial inflation of the air bag movement of the center part of the impact side is arrested by the inflation-controlling members. At that time the abrupt arresting of the movement of the impact side of the air bag imposes high tensile loads in the inflation-controlling members, but such impact loads are partially absorbed by resilient extension of the portions of the fastening members at the junctures with the inflation-controlling members on the gas inflow side of the air bag, whereby separation of the inflation-controlling members from the fastening members is prevented.

A preferred embodiment of this invention is described below with reference to the accompanying drawings.

DESCRIPTION OF THE DRAWINGS

As described above.

DESCRIPTION OF THE EMBODIMENT

Figure 1:
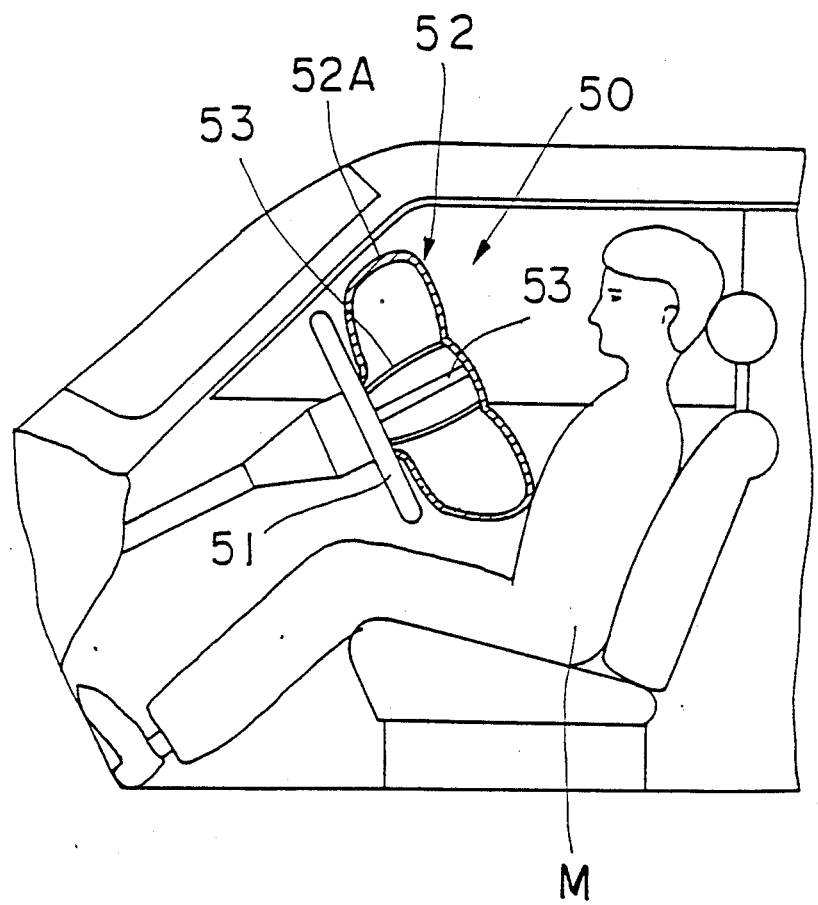
FIG. 1 is a side elevational view of part of a vehicle equipped with a prior art air bag, the air bag being shown in cross-section and inflated.
Figure 2:
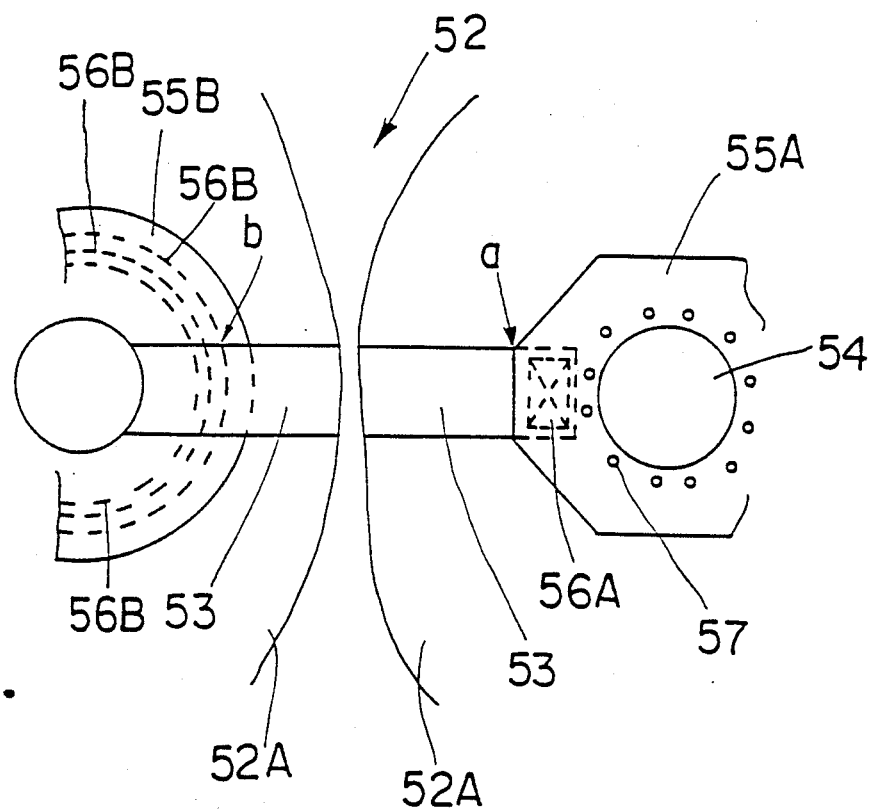
FIG. 2 is a developmental view of parts of the interior of the air bag of FIG. 1.
Figure 3:
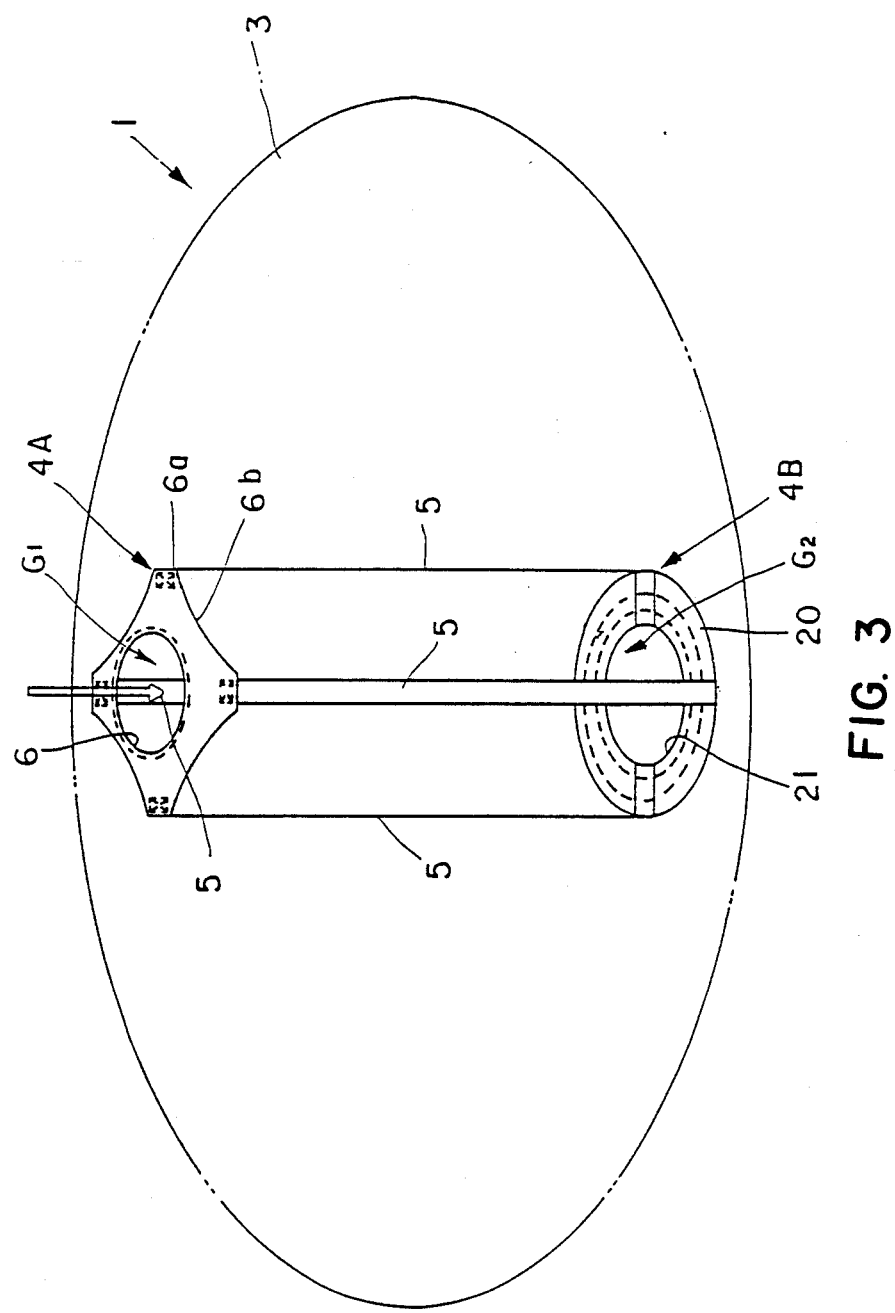
FIG. 3 is a generally representational pictorial view of an air bag embodying the present invention in its inflated condition.

As shown generally in FIG. 3, the air bag 1 comprises an air bag body 3 having the same structure as the conventional air bag body 52A shown in FIG. 1, two fastening members 4A, 4B located at a gas inflow side G1 of the air bag body 3 and at a gas impact side G2, respectively, and four inflation controlling members 5 extending between the two fastening members 4A, 4B and connected to them.

Figure 4:
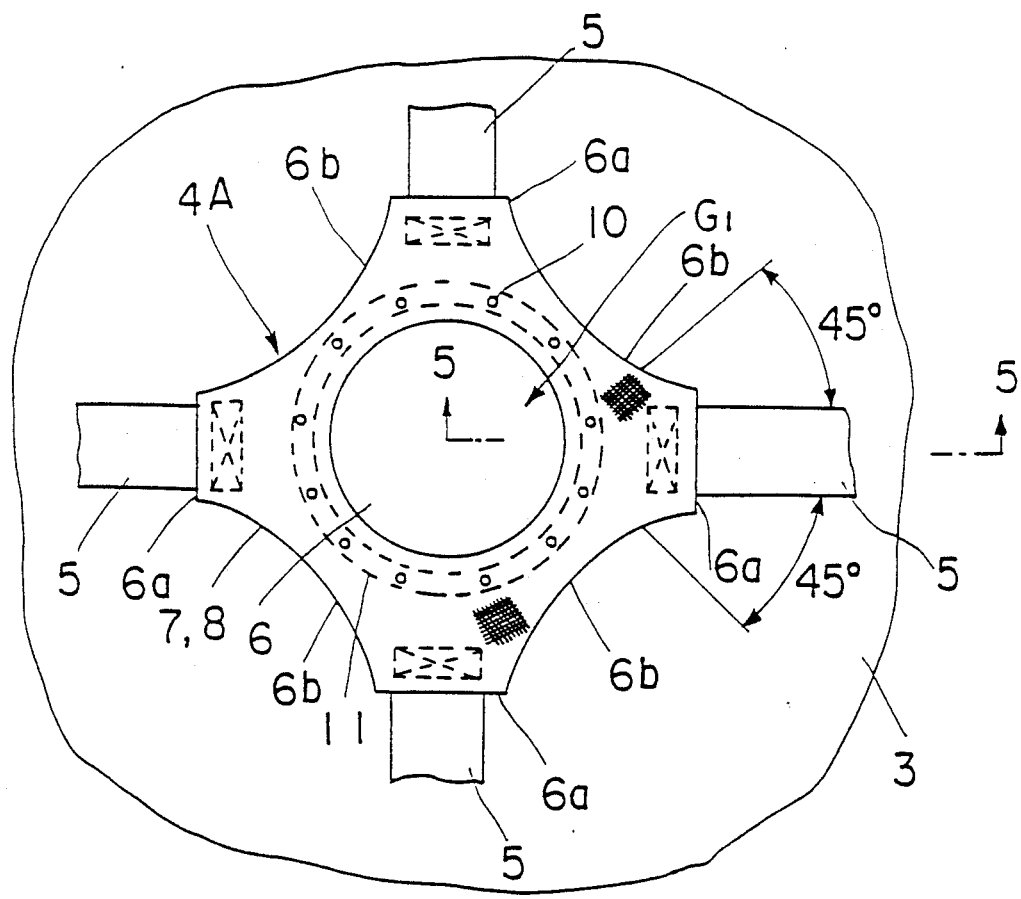
FIG. 4 is a plan view of a portion of the interior of the air bag adjacent the gas inflow opening.
Figure 5:
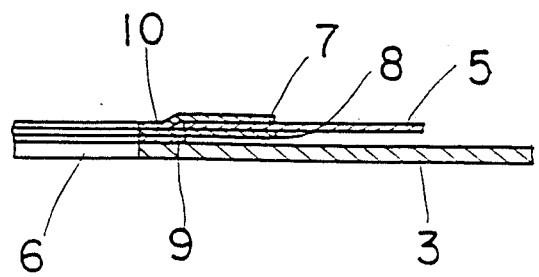
FIG. 5 is a cross-sectional view taken along the lines I—I of FIG. 4.

As shown in FIGS. 4 and 5, the fastening member 4A at the gas inflow side G1 has a gas inflow opening 6 that is coextensive with a circular opening in the air bag body 3. The fastening member 4A comprises a first fabric sheet 7 and a second fabric sheet 8. The sheets 7 and 8 are the same shape and are bounded by four equally spaced apart straight edges 6a and four arcuate edges 6b extending between the ends of the straight edges. An annular member 9 is disposed between the second sheet 8 and the air bag body 3 (FIG. 5).

One end of each of the inflation-controlling members 5 is received between the two sheets 7 and 8 at a corresponding projecting area of the fastening member 4A bounded by a straight edge 6 and portions of the adjacent arcuate edges 6b and is stitched in place by stitch lines forming a rectilinear figure and two diagonals (FIG. 4). The sheets 7 and 8 are pieces cut from a fabric woven from a synthetic resin fiber. The warp and weft of the fabric sheets 7 and 8 are oriented to be aligned at 45° angles to mutually perpendicular axes that bisect the respective oppositely located pairs of straight edges 6a. Thus, the fabrics of the sheets 7 and 8 in the regions where they are joined to the inflation-controlling members 5 lie on a bias to the lengthwise directions of the members 5, i.e., the directions of the tensile loads exerted on them when the bag is inflated. The bias of the fabric in such regions imparts resilience to those regions, in that the warp and weft elements can deform to a slightly rhombic shape under load. Therefore, when the high impact tensile loads are exerted on them, the deformation of the bias portions absorbs some of those loads and reduces the loads imposed on the inflation-controlling members. Hence, the possibility of separation of the inflation-controlling members 5 from the fastening members 4A and 4B is reduced.

Holes 10 are punched in the fastening member 4A (sheets 7 and 8 and annular member 9) and in the air bag body 3 adjacent the gas inlet opening 6 and receive fasteners (not shown) by which the air bag is attached to the inflator. The fastening member 4A is stitched to the air bag body 3 along circular stitch lines 11.

Figure 6:
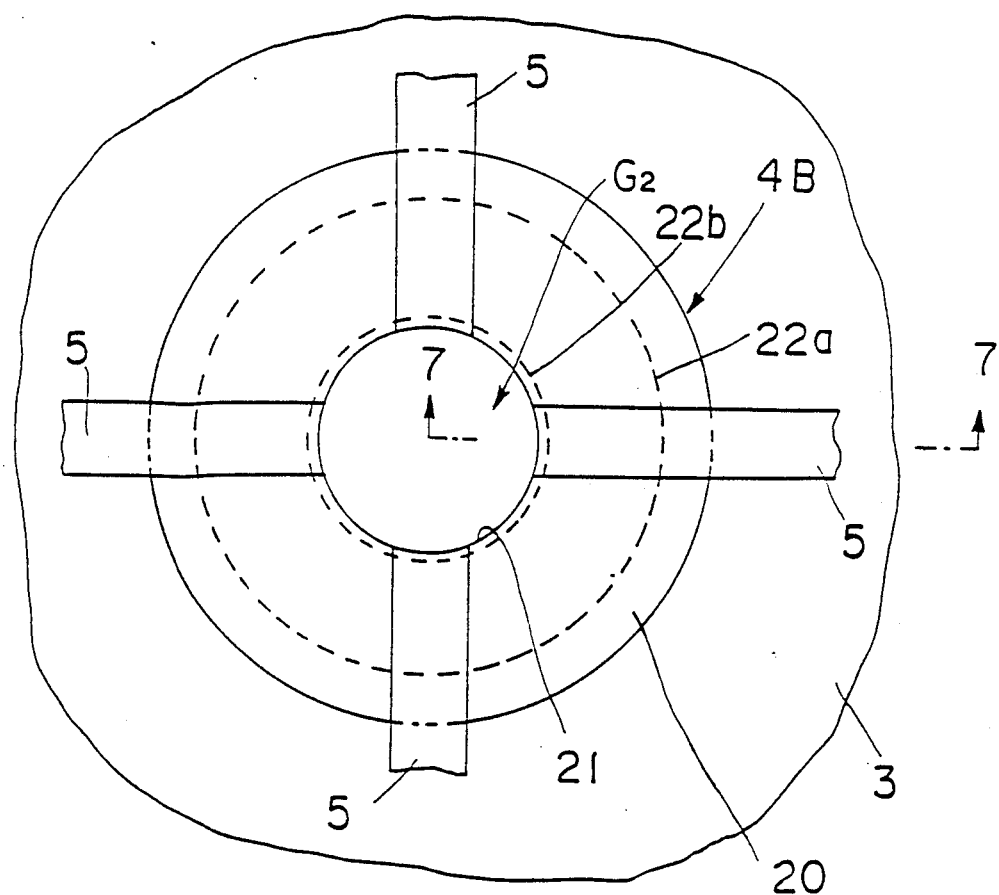
FIG. 6 is a plan view of a portion of the interior of the air bag at the center of the impact side.
Figure 7:
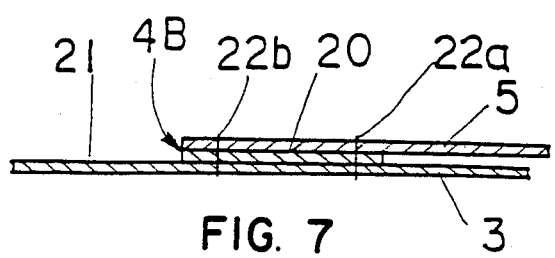
FIG. 7 is a cross-sectional view taken along the lines II—II of FIG. 6.

As shown in FIGS. 6 and 7, the fastening member 4B at the impact side of the air bag is annular, having a circular hole 21 at its center, and is positioned concentric to the geometric center of the impact side of the bag. The ends of the inflation-controlling members 5 are aligned radially at equal spacing, and they and the fastening member 4B are stitched to the air bag body 3 along circular stitch lines 22a and 22b.

I claim:

1. An inflatable air bag for protection of a vehicle occupant by absorbing the secondary impact of the occupant as he or she is thrown forward by inertia and having a first fastening member at the gas inflow side, a second fastening member at the impact side and a plurality of inflation-controlling members connected between the fastening members at junctures therewith, characterized in that at least the portions of the first fastening member forming the junctures with the inflation-controlling members are resilient so that they absorb energy and reduce the impact forces exerted on the inflation-controlling members when they arrest the movement of the impact side of the air bag during inflation, the first fastening member being composed of at least one woven fabric sheet which is positioned such that the portions thereof at the junctures are oriented on a bias to the directions of the impact forces exerted on the inflation-controlling members.

* * * * *